United States Patent [19]

Cohen et al.

[11] Patent Number: 5,160,826
[45] Date of Patent: Nov. 3, 1992

[54] FT-IR SPECTROMETER WINDOW AND METHOD

[75] Inventors: Joel A. Cohen, Shaker Heights; R. Craig Virnelson, Chesterland, both of Ohio

[73] Assignee: Tremco Incorporated, Cleveland, Ohio

[21] Appl. No.: 770,699

[22] Filed: Oct. 3, 1991

[51] Int. Cl.$^5$ .................. G01N 21/35; G01N 21/55
[52] U.S. Cl. ..................... 250/339; 250/341; 356/346
[58] Field of Search ............ 250/339, 341, 505.1; 356/34 C

[56] References Cited

U.S. PATENT DOCUMENTS 4,823,009  4/1989  Biemann et al. ............... 250/339

FOREIGN PATENT DOCUMENTS

75229  4/1987  Japan .......................... 356/346

Primary Examiner—Carolyn E. Fields
Attorney, Agent, or Firm—Konrad K. Kaeding; Ralph E. Jocke; David P. Dureska

[57] ABSTRACT

An FT-IR spectrometer (10) operated for analysis by reflectance spectroscopy, has a window (56) having a body (58) which generally transmits radiation in the visible range there through. The window has a surface (60) for supporting a sample (72) of material to be analyzed. The surface of the window has a coating (62) that generally transmits visible radiation while generally reflecting radiation across the infrared range. The window provides for fast and reliable set up of sample and background scans through use of a visual microscope portion of the spectrometer. The window also has a long life, is durable and is low in cost.

16 Claims, 6 Drawing Sheets

FT-IR SPECTROMETER WINDOW AND METHOD

TECHNICAL FIELD

This invention relates to analysis of materials using a Fourier Transform infrared ("FT-IR") spectrometer. Specifically, this invention relates to a window for supporting a sample analyzed through reflectance spectroscopy using an FT-IR spectrometer.

BACKGROUND ART

FT-IR spectrometers are well known in the prior art. Such spectrometers may be used to identify compounds contained in a sample through recognition of the compounds, characteristic absorption of infrared radiation at various frequencies.

Figure 1:
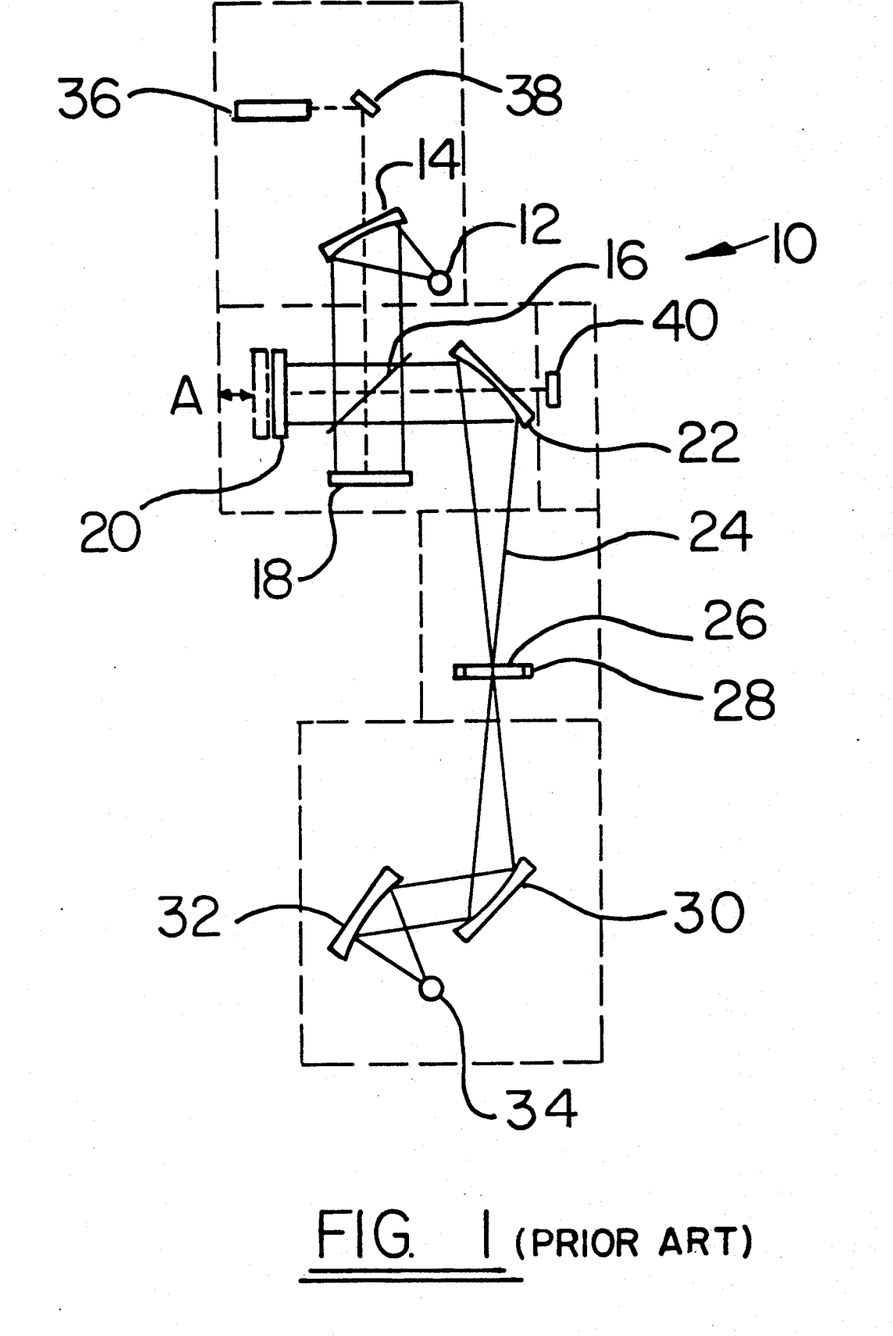
FIG. 1 is a schematic view of a conventional FT-IR spectrometer in a condition for conducting analysis of the sample by transmittance spectroscopy in the manner previously described.

An FT-IR spectrometer is shown schematically in FIG. 1 and is generally indicated 10. The spectrometer includes an infrared source 12. Radiation from source 12 is collimated by a mirror 14. The resultant beam (shown in phantom) passes to and is divided by a beam splitter 16. Half the beam is passed to a fixed mirror 18, and half is directed to a moving mirror 20. Moving mirror 20 is movable in the directions of Arrow A as indicated by phantom outline.

The split beam is reflected by mirrors 18 and 20, recombines at beam splitter 16 and constructively or destructively interferes depending on the difference in the length of the optical paths between mirrors 18 and 20 and the beam splitter.

During operation of the spectrometer, moving mirror 20 moves at a velocity in one direction. As a result, a beam emerges from the beam splitter which is a mixture of modulated frequencies. This mixture is reflected off a mirror 22 onto a path 24. Path 24 passes through a window 26.

Window 26 supports a sample of material to be analyzed. Window 26 is mounted in a positioning apparatus 28, which enables the operator of the spectrometer to move the window so that the sample is in path 24. When the FT-IR spectrometer is operated in the transmittance mode shown in FIG. 1, the window is made from a material that allows radiation in the infrared range to pass therethrough without substantial absorption. Common materials for windows used in transmittance spectroscopy include potassium bromide and sodium chloride.

After the radiation passes through the sample on the window, it is reflected through mirrors 30 and 32, which focus the radiation on an infrared detector 34. Signals are generated by the infrared detector in response to the amplitude of the radiation sensed. These signals are sampled by the FT-IR spectrometer at predetermined intervals during movement of moving mirror 20. The spectrometer operates to plot the superimposed amplitudes of the radiation as a function of time. This produces an interferogram which is unique to the sample material.

The FT-IR spectrometer also has a He-Ne laser source 36. A laser beam from the laser source (shown in phantom) is reflected by a mirror 38 onto the beam splitter 16. The beam from the laser source is divided by the beam splitter and reflected to fixed mirror 18 and moving mirror 20. However, unlike the infrared radiation, the emerging beam from the laser is focused to a laser detector 40. The laser detector detects a modulated signal of constructive and destructive interference depending on the distances between mirror 20 and mirror 18 and the beam splitter. The spectrometer also plot the radiation sensed by the laser detector as a function of time to produce a reference interferogram.

The reference interferogram from the signals produced by the laser detector is used as a reference to convert the interferogram of infrared radiation via a Fourier Transformation into a plot of superimposed amplitudes as a function of frequency. The reference signals from the laser detector 40 are also used to provide feedback for controlling the speed of moving mirror 2 and timing for the sampling of signals from the infrared detector 34.

The FT-IR spectrometer also includes a display such as a CRT or plotter. The display produces a graphical representation of transmittance of the amplitude of the infrared radiation passing through the sample as a function of "wave numbers" which are inversely related to frequency. This graphical representation is characteristic of the compounds which comprise the sample. Through comparison to graphs of samples of known composition, the composition of the unknown sample may be determined.

In absorption spectroscopy the composition of the air in the path, and the material which makes up the window, may absorb radiation at certain frequencies. To compensate for this "background" absorption, it is often desirable after the sample has been scanned to move the positioning apparatus 28 and the window 26 so that the sample is no longer in the path. Another scan is then run with only the air and the window in the path. As a result a background scan is obtained.

The graphical representation of transmittance as a function of wave numbers, obtained in the background scan, may then be subtracted from the sample scan to provide a scan associated exclusively with the sample material. Many commercially available FT-IR spectrometers include means for doing this electronically. Such spectrometers are available from Nicolet, Inc. of Madison, Wis. Such commercially available spectrometers also typically include means for storing and comparing infrared scans of various known compounds with the scan produced by the sample for matching purpose and to determine the makeup of the sample.

A disadvantage of using an FT-IR spectrometer in the transmittance mode is that the window must be made of a material that passes light at most frequencies in the infrared range. However, many materials that have this characteristic react with items that are desired to be analyzed. This makes it difficult to do the analysis. In addition, no window material is perfect for transmitting radiation in the infrared range at all frequencies. As a result, this approach to sample analysis has limitations.

Figure 2:
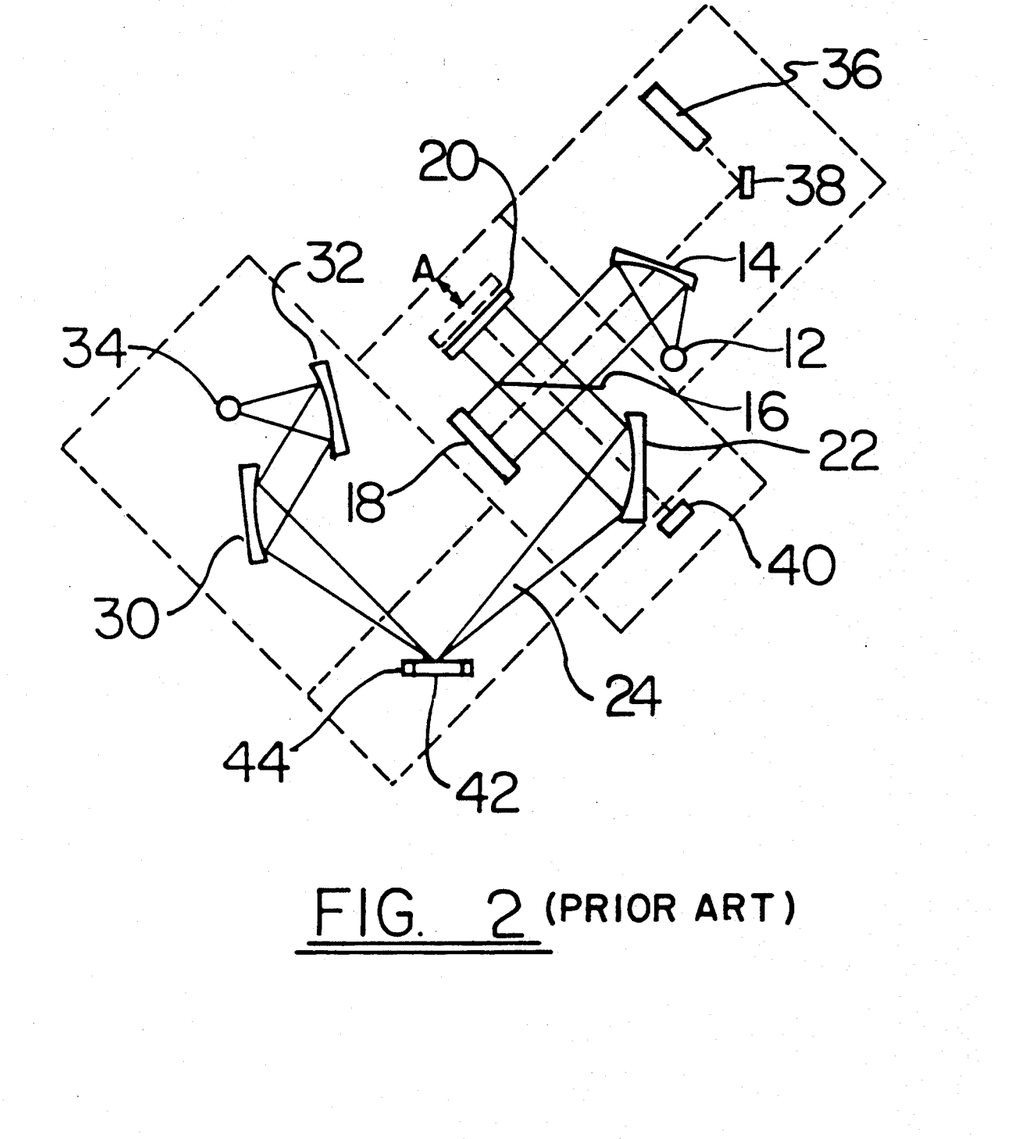
FIG. 2 is a schematic of a conventional FT-IR spectrometer shown in a condition for analysis of a sample by reflectance spectroscopy.

Many FT-IR spectrometers may also be operated to perform reflectance spectroscopy. FIG. 2 shows the spectrometer 10 of FIG. 1 modified to perform reflectance spectroscopy. All of the parts of the spectrometer are the same as in FIG. I except as noted below.

In reflectance spectroscopy the path 24 of the radiation in the infrared range impinges on a sample that is to be analyzed. The sample is supported on a window 42 which is mounted in a positioning apparatus 44. Unlike the window used when the spectrometer is operated in transmittance, window 42 is reflective to radiation. As a result the radiation bounces off window 42 and is passed through the sample a second time before finally passing to the detector. This double pass through the sample provides better, more accurate scanning and analysis in many cases.

However, reflectance spectroscopy using an FT-IR spectrometer has drawbacks. Because the windows are typically glass materials coated with a thin layer of silver or gold, the layer is very fragile and subject to being scratched or abraded during routine handling or cleaning. Damage to the coating may render a scan inaccurate and will require the window to be discarded.

The fragile nature of the window coating also gives each window a short useful life. Further, because the windows are coated with silver or gold, they are expensive. Some windows have been made with a reflective aluminum coating. While aluminum is less expensive, it has the drawback of being reactive with many sample materials.

A further problem with conventional windows used in reflectance spectroscopy is that it may be difficult to position the sample in the radiation path. Some conventional FT-IR spectrometers include a visual microscope with a sight that enables the operator to see the window and the sample on it so he can position the sample in the radiation path. Prior art windows are reflective of both visible light as well as infrared. It may be difficult to see the sample on the window due to an abundance of reflected light. As a result, it is difficult to position a sample to obtain a desired scan. The reflectivity of visual light also makes it difficult for the operator to see the surface of the window to insure that an area used for a background scan does not have imperfections in the coating. This adds uncertainty to the analysis. Other drawbacks associated with conventional windows used for reflectance spectroscopy include the difficulty of sample preparation. In some cases it may be desirable to pass an electric current under the sample being analyzed for purposes such as heating. This is not possible with conventional windows. In addition, silver or gold plated windows do not tend to hold sample materials well, but rather repel the samples causing them to move during handling. It is also difficult to apply items to be analyzed on conventional windows by methods such as condensation. This is because exposure to extremes of temperature or chemical compounds may damage the silver or gold coating. Also, it is sometimes desirable to review a sample in a conventional magnifying microscope. This is not possible for conventional windows which have a coating that is reflective of visible light.

Thus there exists a need for a window for use in reflectance spectroscopy with an FT-IR spectrometer that is more durable, lower in cost and easier to use than prior art windows.

DISCLOSURE OF INVENTION

It is an object of the present invention to provide an FT-IR spectrometer adapted for reflectance spectroscopy that includes a window that has enhanced durability.

It is a further object of the present invention to provide an FT-IR spectrometer adapted for reflectance spectroscopy that has a window that is lower in cost.

It is a further object of the present invention to provide an FT-IR spectrometer adapted for reflectance spectroscopy that has a window that is transparent to visible light while reflective of radiation over the infrared range.

It is a further object of the present invention to provide an FT-IR spectrometer adapted for reflectance spectroscopy in which it is easier to position a sample for analysis in a radiation path.

It is a further object of the present invention to provide an FT-IR spectrometer adapted for reflectance spectroscopy that has a window upon which a sample may be more readily located.

It is a further object of the present invention to provide an FT-IR spectrometer adapted for reflectance spectroscopy that has a window that can be used to provide more reliable background scans.

It is a further object of the present invention to provide an FT-IR spectrometer adapted for reflectance spectroscopy that has a window that may be used to conduct electricity.

It is a further object of the present invention to provide an FT-IR spectrometer adapted for reflectance spectroscopy that has a window which holds a sample to be analyzed with less movement during handling.

Further objects of the present invention will be made apparent in the following Best Modes For Carrying Out Invention and the appended claims.

The foregoing objects are accomplished in the preferred embodiment of the present invention by an FT-IR spectrometer of conventional design operated to perform reflectance spectroscopy. A sample to be analyzed is supported on a window of novel construction and having unique properties that are advantageous.

The window has a body comprised of glass material that transmits most radiation in the visible range. The window body has a surface which supports the sample to be analyzed.

The surface has a coating. The coating is reflective of radiation across the infrared range but enables visible radiation to pass therethrough. The coating is comprised of at least two component layers. The first component layer is reflective of radiation in the infrared range but is generally transparent to visible radiation. The second component layer overlies the first and protects it from damage. The second component layer is transparent to both visible and infrared radiation.

In operation of the FT-IR spectrometer, a visual microscope which is included in the spectrometer is used to locate the sample on the window and position it. By viewing the window and the sample thereon through the visual microscope the operator may move the window to place a desired portion of the sample in the infrared radiation path for analysis. The transmittance of visible light through the window enables the operator using the visual microscope portion to locate the sample and position it precisely.

Thereafter, the visual microscope is no longer used and the infrared scan of the sample is run by the spectrometer to obtain a graphical output of transmittance of radiation with respect to frequency. After this scan is run, the operator may again view the window and the sample through the visual microscope. The operator may then move the window so that the radiation path is through a suitable area for taking a background scan. As the window transmits visible light, any areas where the coating has been damaged are apparent to the operator using the visual microscope and can be avoided during background scans.

Windows that have coatings reflective of radiation across the infrared range and transparent in the visual range ar substantially less expensive than prior windows, are more durable than conventional windows used in reflectance spectroscopy and are easier to use.

BEST MODES FOR CARRYING OUT INVENTION

Figure 3:
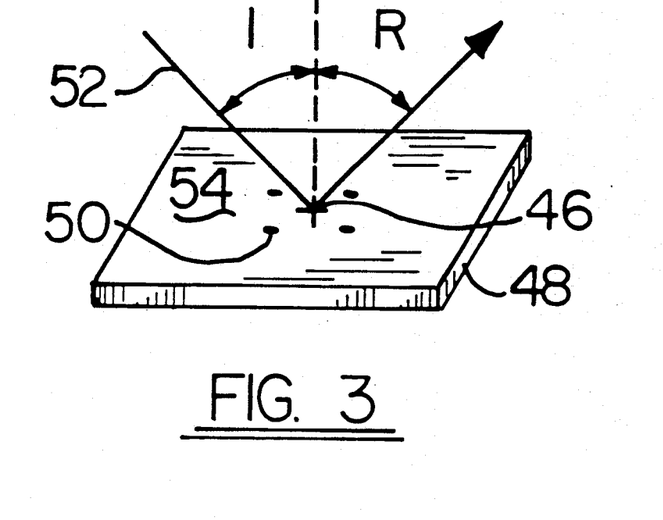
FIG. 3 is a schematic view of a path of infrared radiation reflected off a window of an FT-IR spectrometer operated to perform reflectance spectroscopy.

The present invention is an improvement to FT-IR spectrometers and the windows used therewith, that are operated to perform reflectance spectroscopy in the manner previously described in connection with FIG. 2. To carry out an analysis of a sample with the spectrometer, a sample 46 of the material to be analyzed is placed on a surface of a window 48 as shown in FIG. 3. As represented by the presence of other particles 50 on the window, the sample analyzed is usually one of several small particles of material.

The sample 46 is positioned in a path 52 traveled by infrared radiation produced by the FT-IR spectrometer. In reflectance spectroscopy, the path strikes the sample at an angle of incidence (I) from the vertical. The radiation passe through the sample and strikes a surface 54 of the window. Because the surface of both conventional windows and the novel window of the present invention are reflective of radiation in the infrared range, the radiation is reflected back through the sample 46 at an angle of reflection (R) which is equal to the angle of incidence. For the analysis of most materials, the angles of incidence and reflection are about 30 degrees from the vertical. However, for some types of samples the results of the analysis may be improved by increasing the angle of incidence. In some cases the angle may be as high as 80 degrees.

Figure 4:
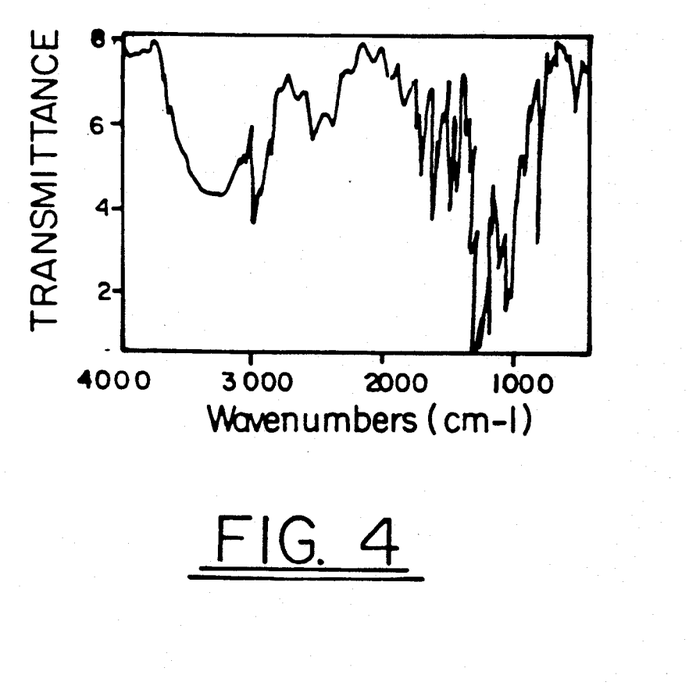
FIG. 4 is an example of a graphical output of transmittance versus wave numbers produced by an FT-IR spectrometer through a scan of a sample.

The infrared radiation passed through the sample and reflected off the window is detected and analyzed by the spectrometer in the manner previously described to produce a graph of the amplitude of the reflected radiation as a function of frequency. An example of such a graph is shown is FIG. 4. Because many compounds absorb such radiation in distinct amounts and at particular frequencies, the output of the FT-IR spectrometer may be used to identify the compounds in the sample. This is done by comparing the graphical output produced by the sample to outputs from known substances. Typically, FT-IR spectrometers include, or are connected to, computer storage for holding information about such outputs and a processor means for comparing the output from the scan of the sample to the stored information for purposes of matching the characteristic absorption patterns.

As previously discussed, the scan made by the spectrometer is often affected not only by the composition of the sample, but also the materials in the air in the radiation path, as well as the absorption properties of the window. To eliminate these variables from the analysis, it is often desirable to run a background scan after the sample scan. The background scan is done by reflecting the radiation off a clean portion of the window. The background scan is then subtracted from the scan obtained from the sample to produce a scan that is more representative of the sample alone. This reduces the possibility for error in the analysis.

The prior art windows used in reflectance spectroscopy are expensive, easily damaged and difficult to position in the spectrometer. The novel window of the present invention overcomes these difficulties and has many other advantageous properties.

Figure 5:
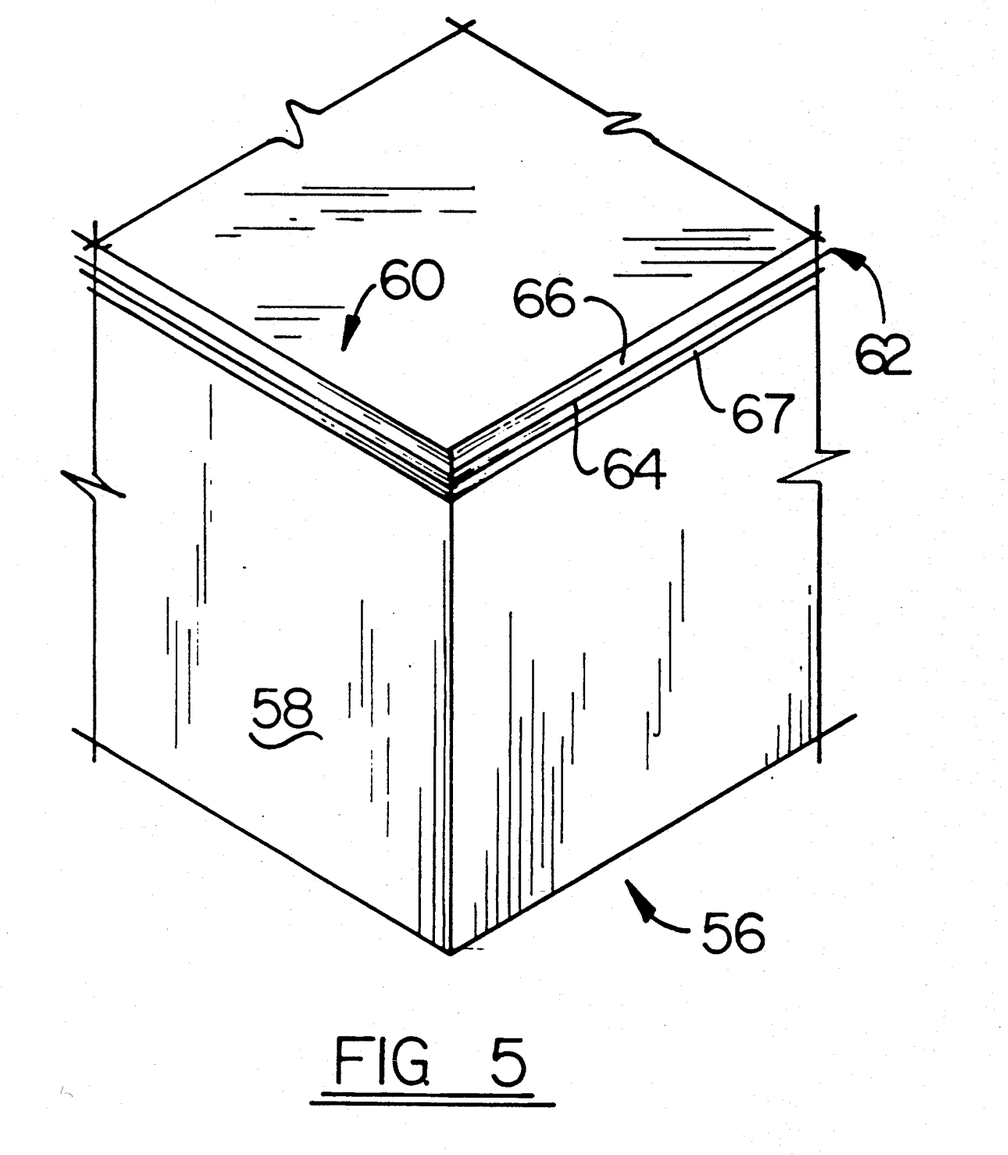
FIG. 5 is a schematic view of a window of the preferred embodiment of the present invention.

A window 56 of the preferred embodiment of the invention is shown in FIG. 5. Window 56 has a body 58 of conventional glass material such as glass used in commercial or household window applications. Body 58 has a surface 60 for supporting a sample to be analyzed. Surface 60 has a coating 62. Coating 62 transmits most radiation across the visible range while reflecting most radiation across the infrared range. Coating 62 is comprised of a first component layer 64 and a second component layer 66. The window also has a third component layer 67.

The third component layer 6 is applied directly to the body of the glass. In the preferred embodiment it is a microscopic layer of tin oxide. In other embodiments, other metallic oxides may be used, or the third component layer may be deleted In the preferred form of the invention, first component layer 64 is a mono atom layer of silver. The silver is typically applied over the third component layer by a sputtering process that is well known in the prior art. The sputtering process produces a layer of silver that is typically 85 to 95% reflective of infrared radiation, while transmitting most visible light.

Applicants have also found that applying the layer of silver (as well as the other component layers) to the body of the window through a pyrolytic process, will also produce a usable window. However, when the first component layer is applied by a pyrolytic process, the window is often less reflective across the infrared range, usually in the 60 to 70% range.

A second component layer 66 overlies the first component layer 64. Second component layer 66 is a protective coating that serves to prevent damage to the underlying layer. In the preferred embodiment of the invention, the second component layer is transparent to most radiation across the visible and infrared ranges. Applicants have found that a second component layer consisting of tin oxide performs well and is highly resistant to damage and abrasion. This material further provides a coating on which samples may be spread more readily by pressure without damaging the window. A layer of tin oxide, unlike an exposed silver layer on prior art windows, also provides sufficient attraction to most sample materials that the samples will not move of fall off the window during handling.

Applicants have also found that other materials may be successfully used for the second component layer 66. These materials include zinc oxide and titanium oxide. It is expected that other materials may also be successfully used in other embodiments of the invention, provided that they serve to protect the first component layer from abrasion and other damage and transmit radiation across the visible and infrared ranges without significant absorption. It is to be further understood that while silver is used in the preferred embodiment with the first component layer, in other embodiments other materials which ar sufficiently reflective across the infrared range and transparent across the visible range may be used. Layers in addition to two may be used in other embodiments.

Applicants have found that coated glass material suitable for use in windows of the present invention is commercially available. One type is produced by Cardinal IG of Minneapolis, Minn. and is provided as low emissivity or "low-E" glass, which is used in commercial and residential window applications. Other companies make similar materials for residential and commercial structures. Such companies include Guardian Industries of Northville, Mich. and PPG Industries of Pittsburgh, Pa. As a result, the cost of the material for the windows of the present invention used with an FT-IR spectrometer, is very low compared to the cost of prior art windows used for reflectance spectroscopy.

Figure 6:
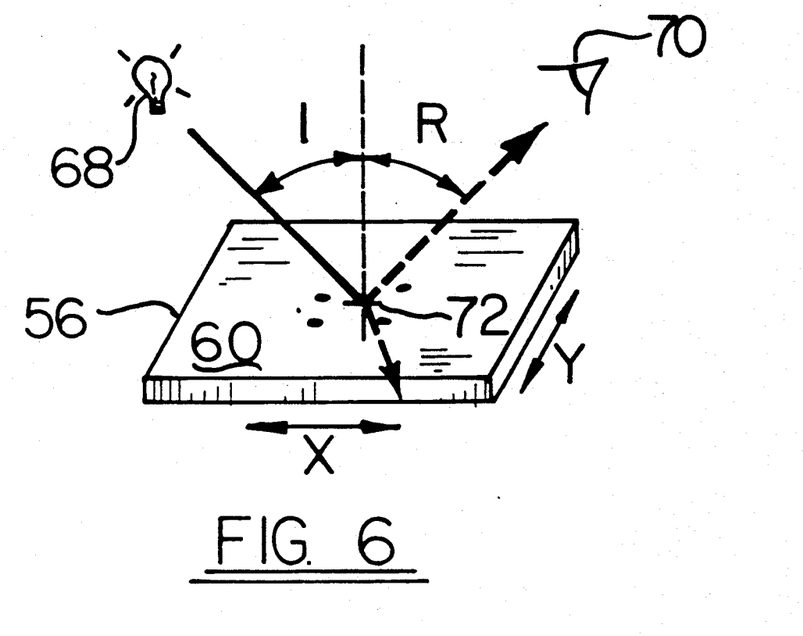
FIG. 6 is a schematic view of the manner in which a sample is viewed through a visual microscope portion of an FT-IR spectrometer.

A fundamental advantage of the window of the present invention is the ease by which samples may be prepared for the FT-IR spectrometer. As previously mentioned, such spectrometers sometimes include a visual microscope means through which an operator may optically view the window and the sample. FIG. 6 is a schematic of the visual microscope portion of an FT-IR spectrometer. In setting up the sample, a visible light source 68 is directed onto the surface 60 of window 56. Because the coating 62 on surface 60 is transparent to most of the visible spectrum, a considerable portion of the light passes through the window. However, some light is reflected back to the eye of the operator 70.

Figure 7:
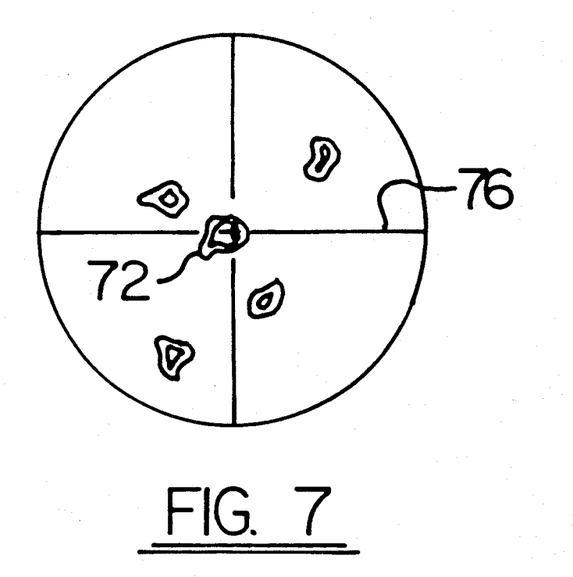
FIG. 7 is a schematic view of what is seen through the visual microscope portion of an FT-IR spectrometer when a sample is supported on the window as shown in FIG. 5.

A sample 72 on the surface of the window also reflects visible light and can be seen by the operator through the visual microscope. By moving the positioning means which holds the window 56 in the x and y directions as shown in FIG. 6, the operator may move a desired portion of the sample into the path which will be traveled by the infrared radiation when it passes through the spectrometer. FIG. 7 shows what an operator sees in the visual microscope portion of the FT-IR spectrometer when it is set up as shown in FIG. 6. Position indicating means 76 mark the point of impingement of the infrared radiation on the sample 72. The sample typically appears with interference bands due to reflectance affects of transmitted light off the top and bottom surfaces of the sample. However, the sample is clearly visible and can be positioned by moving the window to an area where the thickness of the sample is suitable for scanning. In the preferred embodiment of the invention, the open area of the window which surrounds the sample has a distinct green color that is readily apparent to the operator.

Figure 8:
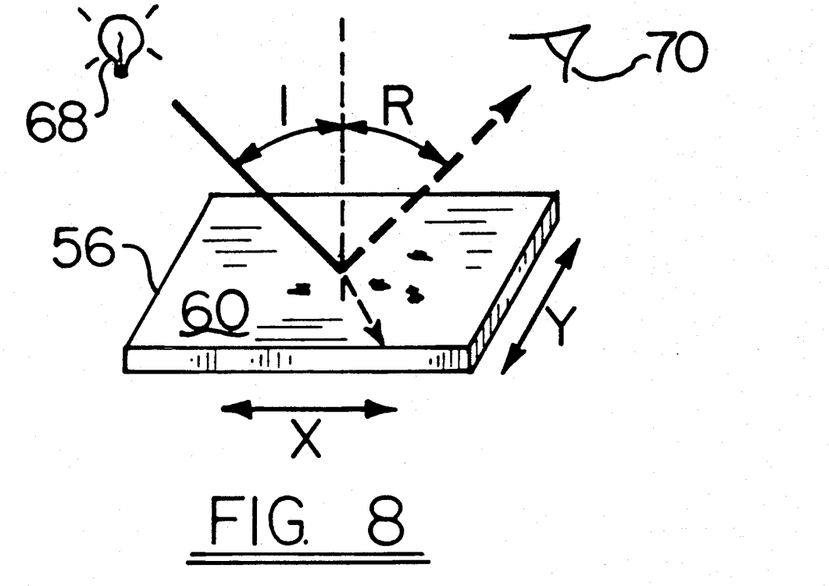
FIG. 8 is a further schematic view of a window viewed through a visual microscope portion of an FT-IR spectrometer when the window is positioned for taking a background scan.
Figure 9:
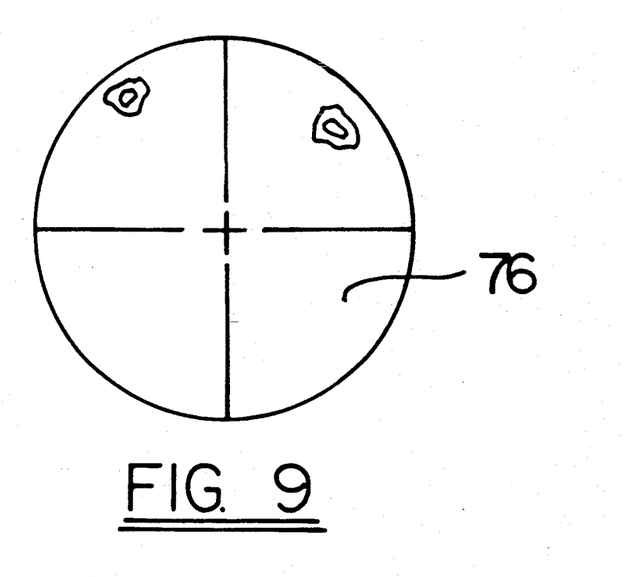
FIG. 9 is a view of what is seen through the visual microscope portion of an FT-IR spectrometer when the window of FIG. 5 is positioned for conducting a background scan.

After the sample is scanned, it is often desired to conduct a background scan to determine and neutralize any extraneous readings. As shown in FIGS. 8 and 9, when a background scan is to be conducted, the window 56 is moved through use of the positioning apparatus so that none of the sample will be impacted by the infrared radiation. Using the window of the preferred embodiment, it may be readily seen that the area of the window selected for impingement by the infrared radiation during the background scan is suitable for this purpose. This is because the area will exhibit the distinct green color if it is clean and undamaged. This is in contrast to the prior art reflectance windows where the reflection of visible light off the surface of the window makes it difficult to visually locate the sample or any damaged areas of the surface of the window. Other varieties of windows incorporating the present invention, may exhibit other colors, such as pink or blue, in clean and undamaged areas when viewed through the visual microscope.

The preferred embodiment of the present invention also presents other advantages that may not be achieved with the prior art. Electricity may be conducted through the first component layer of the window of the present invention. This enables the effect on the sample of the current or processes such as heating to be determined. As a result, the spectrometer may demonstrate how the composition of the sample changes with heat and time.

The novel window of the present invention also presents advantages in that it enables preparation of samples using a separate conventional visual microscopes. The sample may be viewed in advance of scanning to be sure that it is suitable. This avoids tying up the FT-IR spectrometer to prepare the samples. Samples may also be treated directly o the window by chemical processes or other processes such as bombardment by types of radiation. The durability of the coating on the window makes it inert to most such treatments. Samples may also be collected directly on the window by processes such as condensation. The durability of the window construction enables analysis of samples through reflectance spectroscopy that were previously exceedingly difficult to obtain or impossible.

Thus, the new FT-IR spectrometer window and method of the present invention achieves the above stated objectives, eliminates difficulties encountered in the use of prior devices and systems, solves problems and obtains the desirable results described herein.

In the foregoing description, certain terms have been used for brevity, clarity and understanding, however, no unnecessary limitations are to be implied therefrom because such terms are for descriptive purposes and are intended to be broadly construed. Moreover, the descriptions and illustrations are by way of examples and the invention is not limited to the details shown and described.

Having described the features, discoveries and principles of the invention, the manner in which it is constructed and operated and the advantages and useful results obtained; the new and useful structures, devices, elements, arrangements, parts, calculations, systems, equipment, operations and relationships are set forth in the appended claims.

We claim:

1. An FT-IR spectrometer adapted for analyzing a sample supported on a window by reflectance spectroscopy, wherein an improvement comprises:

a window including a surface means for supporting said sample, said surface means including a coating generally reflective of radiation across the infrared range while generally transmitting radiation in the visible range.

2. An FT-IR spectrometer according to claim 1 wherein said coating comprises a first component layer reflective of the radiation in the infrared range, and a second component overlying said first component layer, said second component layer enabling the passage of visible and infrared radiation therethrough and relatively resistant to scratching and abrasion.

3. An FT-IR spectrometer according to claim 2 wherein the second component layer consists essentially of an oxide of tin, zinc or titanium.

4. An FT-IR spectrometer according to claim 3 wherein said first component layer is comprised essentially of silver.

5. An FT-IR spectrometer according to claim 4 wherein said window further comprises a third component layer underlying said first component layer, said third component layer consisting essentially of tin oxide.

6. An FT-IR spectrometer according to claim 1 wherein said spectrometer includes visual microscope means for optically viewing said sample, said spectrometer further including positioning means for positioning said sample in a path traveled by radiation in the infrared range, and wherein said window has a body comprised of material generally transparent to radiation in the visible range, whereby said sample may be readily positioned in said path and removed from said path by an operator viewing said window through said visual microscope means.

7. An FT-IR spectrometer according to claim 4 wherein said spectrometer includes visual microscope means for optically viewing said sample, said spectrometer further including positioning means for positioning said sample in a path traveled by radiation in the infrared range, and wherein said window has a body comprised of glass material generally transparent to radiation in the visible range whereby said sample may be readily positioned in said path and removed from said path by an operator viewing said sample through said visual microscope means.

8. An FT-IR spectrometer according to claim 2 wherein said first component layer is comprised of electrically conductive material, whereby said sample may be affected by passing electric current through said first component layer.

9. Apparatus comprising an FT-IR spectrometer including a window, said spectrometer adapted for analyzing a sample supported on said window by reflectance spectroscopy, said spectrometer including visual microscope means for optically viewing said sample, and positioning means for enabling positioning of said sample in a path traveled by radiation in the infrared range through said spectrometer,
said window comprising:
a body having a surface means for supporting said sample, said body comprised of material generally transparent to radiation in the visible range; and
a coating on said surface means, said coating generally reflective of radiation across the infrared range while enabling passage of radiation in the visible range,
whereby said sample is readily positioned in said path using said visual microscope means.

10. An apparatus according to claim 9 wherein said coating comprises a first component layer generally reflective of radiation in the infrared range, and a second component overlying said first component layer, said second component layer generally enabling passage of visible and infrared radiation therethrough and relatively resistant to scratching and abrasion.

11. An apparatus according to claim 10 wherein said second component layer consists essentially of an oxide of tin, zinc or titanium.

12. An apparatus according to claim 11 wherein said first component layer consists essentially of a mono atom layer of silver.

13. An apparatus according to claim 12 and further comprising a third component layer underlying said first component layer, said third component layer consisting essentially of tin oxide.

14. A method for analyzing a sample supported on a window of an FT-IR spectrometer through reflectance spectroscopy, said spectrometer including visual microscope means for optically viewing said window and the sample thereon, and positioning means for positioning said window,
said method including the steps of:
passing radiation in the infrared range along a path through said sample;
reflecting said radiation off said window;
passing said radiation back through said sample;
detecting the passage of said radiation through said sample whereby a reading from said FT-IR spectrometer is obtained;
and wherein an improvement comprises the steps of:
prior to said other steps, supporting said sample on a window having a body generally transparent to radiation in the visible range, said window having a surface supporting said sample, said surface having a coating generally reflective of radiation in the infrared range and transparent to radiation in the visible range; and
positioning said sample in said path with said positioning means by viewing said sample through said visual microscope means.

15. The method according to claim 14 and subsequent to the step of obtaining said reading, further comprising the steps of:
positioning said window with said positioning means by viewing said window with said visual microscope means so said path is not through said sample;
reflecting said radiation in the infrared range off said window remote from said sample; and
detecting the passage of said radiation in the infrared range, whereby a background reading is obtained.

16. A method for analyzing a sample supported on a window of an FT-IR spectrometer through reflectance spectroscopy,
said method comprising the steps of:
passing radiation in the infrared range along a path through said sample;
reflecting said radiation off a window, said window including a surface supporting said sample, said surface including a coating generally reflective of radiation across the infrared range while generally transmitting radiation in the visible range;
passing said radiation in the infrared range back through said sample; and
detecting the radiation passed through said sample, whereby a reading from said FT-IR spectrometer is obtained.

* * * * *